No. 741,158. PATENTED OCT. 13, 1903.
T. & C. T. NESOM.
SPEED REGULATOR.
APPLICATION FILED OCT. 11, 1902.
NO MODEL. 2 SHEETS—SHEET 1.
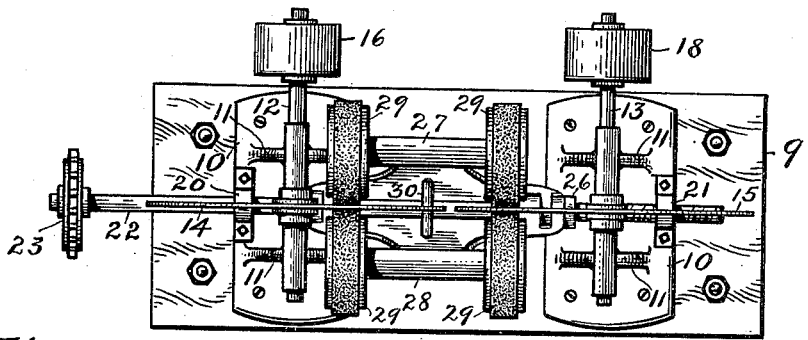
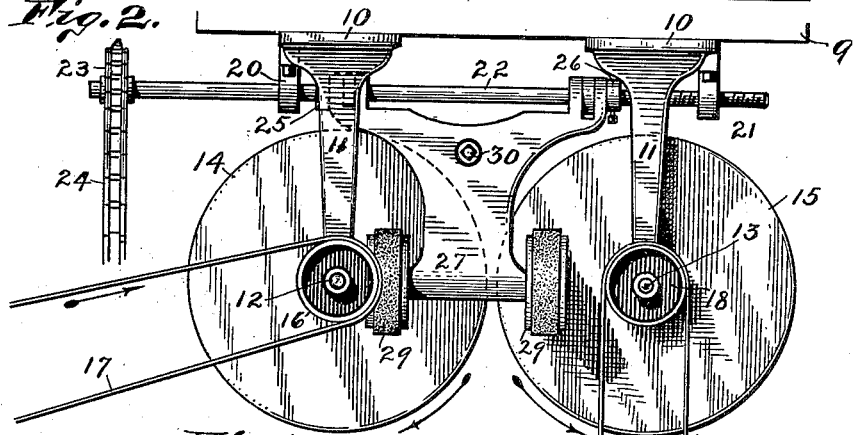
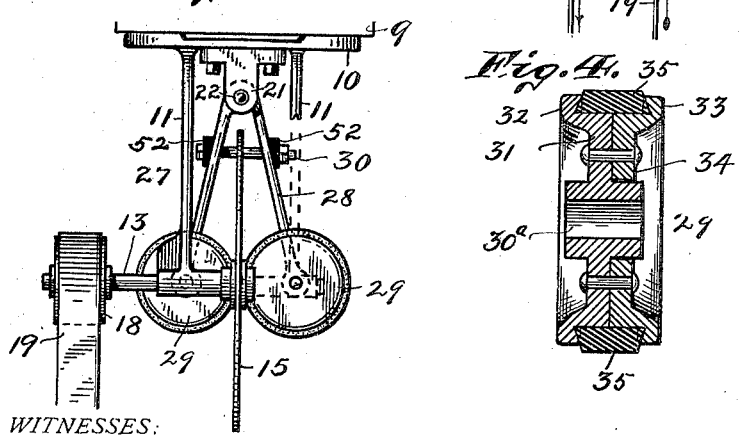
WITNESSES:
F. W. Woerner.
John B. Sherwood
INVENTORS
Thomas Nesom,
Charles T. Nesom,
BY Joseph A. Minturn
ATTORNEY.

No. 741,158. PATENTED OCT. 13, 1903.
T. & C. T. NESOM.
SPEED REGULATOR.
APPLICATION FILED OCT. 11, 1902.
NO MODEL. 2 SHEETS—SHEET 2.
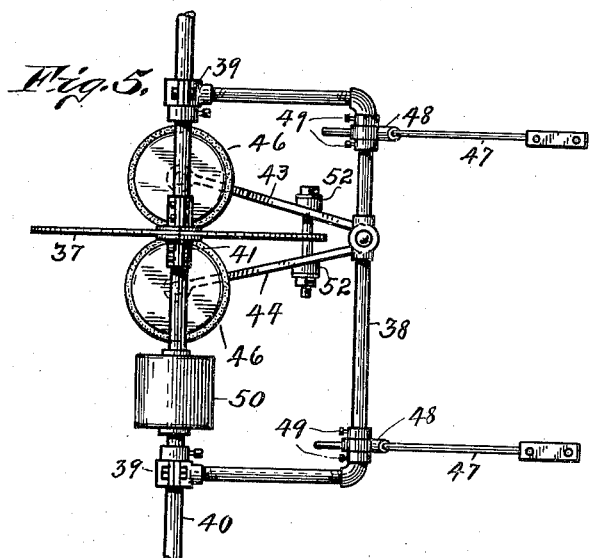
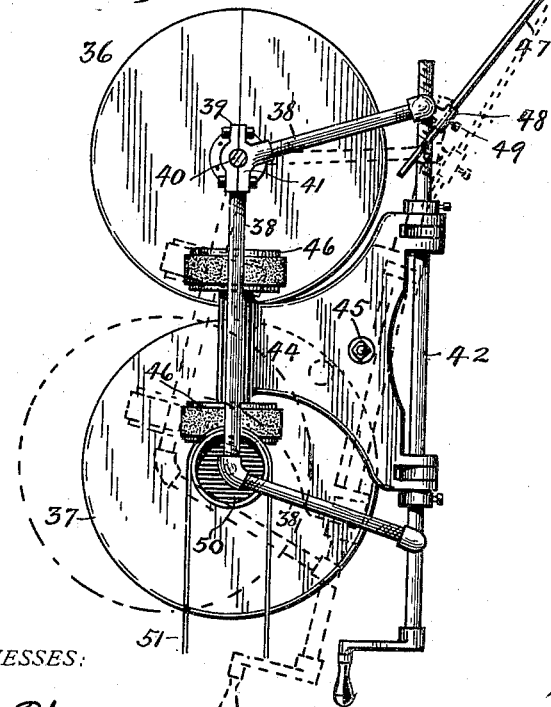
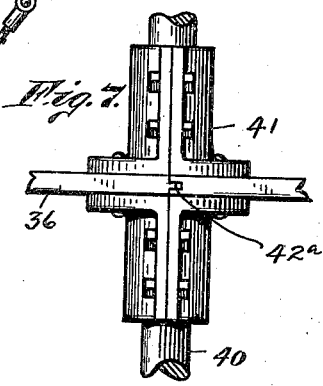
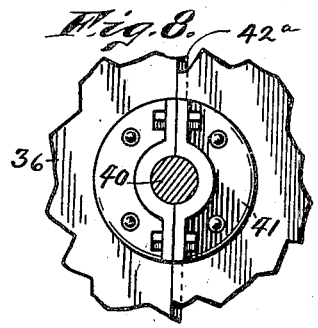
WITNESSES:
F. W. Woerner
John B. Sherwood
INVENTORS
Thomas Nesom,
BY Charles T. Nesom,
Joseph A. Minturn,
ATTORNEY.

No. 741,158. Patented October 13, 1903.

UNITED STATES PATENT OFFICE.

THOMAS NESOM AND CHARLES T. NESOM, OF INDIANAPOLIS, INDIANA.

SPEED-REGULATOR.

SPECIFICATION forming part of Letters Patent No. 741,158, dated October 13, 1903.

Application filed October 11, 1902. Serial No. 126,828. (No model.)

*To all whom it may concern:*

Be it known that we, THOMAS NESOM and CHARLES T. NESOM, citizens of the United States, residing at Indianapolis, in the county of Marion and State of Indiana, have invented certain new and useful Improvements in Speed-Regulators, of which the following is a specification.

This invention relates to improvements in variable-speed regulators involving a driving and a driven disk interposed between the motor and the work; and the object of the invention is, first, to provide means through a double pair of friction-wheels placed on opposite sides of a pair of disks revolving in the same plane for driving one disk from the other and for varying the speed of the driven disk by changing the points of contact between the two disk centers of the friction-wheels with said disks; second, to provide means for regulating the adhesion or traction between the friction-wheels and the disks, and, third, to provide a simple, durable, and easily-adjusted speed-regulator.

The object also is to improve the device in many minor details, which will all be fully described in the specification and pointed out in the claims.

We accomplish the objects of the invention by the mechanism illustrated in the accompanying drawings, in which—

Figure 1 is an under side plan view of our invention; Fig. 2, a side elevation of same; Fig. 3, an end view with one of the hangers broken away to show the parts behind; Fig. 4, a detail in transverse section of one of the friction-wheels; Fig. 5, an under side view of a modified form of our invention adapted to be swung from the driving-shaft; Fig. 6, a view in side elevation of same; Fig. 7, a detail in top view of the split disk of the modified form shown in Fig. 6, showing the manner of bolting the two parts together; and Fig. 8 a detail in side elevation of same.

Like characters of reference indicate like parts throughout the several views of the drawings.

9 is a plate, preferably of wood, which is bolted or otherwise securely fastened to the ceiling of the room over the machine to be operated. Secured to this wooden plate 9 are the two metal plates 10 10, from each of which depend a pair of hangers 11 11. These hangers have boxes in which the shafts 12 and 13 are mounted. Mounted on shaft 12 between the adjacent pair of hangers is the disk 14, and mounted on shaft 13 between the hangers which support it is the disk 15. These two disks are made out of circular plates of sheet steel or iron and are in the same vertical plane. Mounted on shaft 12 is the pulley 16, which is connected to any suitable motor by belt 17. Mounted on shaft 13 is the pulley 18, which is connected by belt 19 with a pulley on the machine to be driven. (Not shown.)

The plates 10 10 have the box-hangers 20 and 21, respectively, in which is mounted the shaft 22. Mounted on one end of said shaft 22 is the sprocket-wheel 23, having the chain 24, which extends down within reach of the operator below. The other end of shaft 22 is screw-threaded, and the box 21, which receives it, is correspondingly screw-threaded. Mounted on shaft 22 are the two collars 25 and 26, which may be held at a fixed position by means of set-screws, as shown. Suspended from this shaft 22, between the said two collars, are the hangers 27 and 28, having eyes through which the shaft 22 passes, thereby forming hinges, as shown. The lower ends of said hangers have boxes in which short shafts are mounted. There is one shaft for each hanger, and mounted on the two projecting ends of each shaft are the friction-wheels 29—four in all. These friction-wheels are in pairs, with one of the two disks between each pair, and the opposing friction-wheels are brought against the respective separating-disk by the bolt 30, which connects the two hangers 27 and 28. The tension is regulated by tightening or loosening the nut on said bolt.

The rotation of the shaft 22 causes it to move in a longitudinal direction, thereby carrying the hangers 27 and 28 and their respective friction-wheels. The centers of the shafts on which wheels 29 are mounted are in the same plane as the longitudinal centers of shafts 12 and 13, thereby causing the friction-wheels to contact with the disks at points on a line drawn from the center of shaft 12 to the center of shaft 13. When the wheels 29 are in their closest relation to shaft 12, the disk 15 will be rotated at its slowest speed, and the speed of the latter will be increased proportionately with the movement of the friction-wheels toward the shaft 13.

The construction of the friction-wheels 29 is shown in Fig. 4, in which a hub 30ª has the web 31, with the half-rim 32. An opposite half-rim 33 has a web 34, through which it is bolted or riveted to the web 31. The combined rim from the two halves 32 and 33 has a dovetailed groove through its center in which is seated a facing 35, of leather or other material, to increase the traction between the wheels and disks. The rim 32 33 need not be finished or trued up; but the leather facing after insertion is turned true to the axis of its shaft.

In the modification shown in Figs. 5 to 8, inclusive, the two disks 36 and 37 are mounted in a suitable frame 38, and the whole device is suspended from the main or line shaft of the shop above the machine to which power is to be applied. The frame has the two-part boxes 39, which are taken apart to receive the line-shaft 40. The disk 36 is a split disk, having a split hub 41. The two straight edges of the split disk are joined by a tongue and groove 42ª, and the two-part hub is bolted together, as shown in Figs. 7 and 8. A screw-shaft 42 has the two brackets 43 and 44 hinged to it and held a regulated distance apart by the bolt 45. The brackets carry shafts which have the friction-wheels 46, similar to the wheels 29, above described.

The above device is held from swinging around shaft 40 by the braces 47 47. These are rods hinged at their upper ends to the ceiling of the room or other fixed support and having their lower ends projected through sleeves 48, which are hinged to the frame. Set-screws 49 hold any desired adjustment of the rods in their respective sleeves. The pulley 50 on the shaft of the lower disk is connected by belt 51 with the machine to be driven, and a tightening of the belt may be accomplished by setting the braces 47 so as to move the frame, and thereby the belt-pulley 50, in right direction to tighten the belt. The dotted lines in Fig. 6 show the parts in this changed position for tightening the belt.

The disks 14 and 15 will preferably be made of sheet metal of such thinness as to be flexible to an extent that will cause any unevenness of surface to straighten out while passing the friction-wheels, and to additionally safeguard against friction between the disks and their friction-wheels, which might be caused by sharp indentations or the like in the disk, we provide the elastic washers 52 between the head or nut of bolt 45 and the hangers which the bolt connects, whereby an amount of play sufficient to afford relief is insured.

Having thus fully described our invention, what we claim as new, and wish to secure by Letters Patent, is—

1. In a speed-regulator, a pair of thin flexible disks mounted adjacent to each other in a common plane, pairs of friction-wheels one pair on each side of said disks the two wheels of each pair contacting with opposite disks, a screw-threaded shaft, a stationary box having a threaded opening through which the threaded shaft passes, a pair of supporting-frames hinged to said shaft on opposite sides of the two disks, collars to prevent longitudinal displacement of the frames on said shaft, each of said frame-supports having a short shaft on which a pair of said friction-wheels is mounted said short shafts, a screw-threaded bolt connecting said pair of supporting-frames to regulate their distance apart and an elastic material under the nut of the bolt.

2. In a speed-regulator, a driving-shaft, a frame suspended from and having a swinging adjustment around said shaft, a flexible friction-disk mounted on said shaft within the frame, a second flexible friction-disk mounted within the frame below the first disk, auxiliary shafts, friction-wheels on said shafts forming driving connection between the disks, and a brace adjustable in its length connected with the frame and with a fixed support outside of said frame.

3. In a speed-regulator, a driving-shaft, a frame suspended from and having a swinging adjustment around said shaft, a split friction-disk of thin flexible material mounted on said shaft within the frame, a second flexible friction-disk mounted within the frame below the first disk, auxiliary shafts, friction-wheels on said shafts forming driving connection between the disks, and a brace adjustable in its length connected with the frame and with a fixed support outside of said frame.

In witness whereof we have hereunto set our hands and seals, at Indianapolis, Indiana, this 7th day of October, A. D. 1902.

THOMAS NESOM. [L. S.]
CHARLES T. NESOM. [L. S.]

Witnesses:
JOSEPH A. MINTURN,
S. MAHLON UNGER.